United States Patent
Uh

(10) Patent No.: US 8,652,681 B2
(45) Date of Patent: Feb. 18, 2014

(54) SECONDARY BATTERY HAVING A STEPPED CAN AND AN INSULATION CASE WITH AT LEAST ONE PROJECTION

(75) Inventor: Hwail Uh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 804 days.

(21) Appl. No.: 12/416,601

(22) Filed: Apr. 1, 2009

(65) Prior Publication Data

US 2009/0311594 A1    Dec. 17, 2009

(30) Foreign Application Priority Data

Jun. 12, 2008    (KR) .................. 10-2008-0055049

(51) Int. Cl.
*H01M 2/00*    (2006.01)

(52) U.S. Cl.
USPC ........... 429/163; 429/176; 429/175; 429/185; 429/170

(58) Field of Classification Search
USPC ......... 429/163, 164, 170, 174, 176, 177, 185, 429/186, 175, 178
See application file for complete search history.

(56) References Cited

U.S. PATENT DOCUMENTS

| | | |
|---|---|---|
| 2005/0136325 A1 | 6/2005 | Fujihara et al. |
| 2006/0263679 A1 | 11/2006 | Park et al. |
| 2006/0269838 A1 * | 11/2006 | Song et al. ................... 429/174 |
| 2010/0151282 A1 | 6/2010 | Koh et al. |

FOREIGN PATENT DOCUMENTS

| | | |
|---|---|---|
| EP | 1 926 160 A1 | 5/2008 |
| EP | 1 970 722 A3 | 9/2008 |
| JP | 06-096748 A | 4/1994 |
| JP | 09-283111 A | 10/1997 |
| JP | 10-284018 A | 10/1998 |
| JP | 2000-243364 | 9/2000 |
| JP | 2003-109554 | 4/2003 |
| JP | 2005-158607 A | 6/2005 |
| JP | 2006-310293 A | 11/2006 |
| KR | 1020050080515 | 8/2005 |
| KR | 1020050080516 A | 8/2005 |
| KR | 1020060013936 | 2/2006 |
| KR | 1020060027275 A | 3/2006 |
| KR | 100739968 | 7/2007 |
| KR | 2007-0108765 | 11/2007 |
| KR | 100816218 | 3/2008 |
| WO | WO 2008/050956 A1 | 5/2008 |

OTHER PUBLICATIONS

Notice of Allowance for related application KR 10-2008-0055049 dated Aug. 24, 2010.
Office Action dated May 12, 2011 for corresponding Chinese Patent Application No. 200910138284.X.
Office Action dated Jun. 26, 2012 for corresponding JP Application No. 2009-140951.

* cited by examiner

*Primary Examiner* — Raymond Alejandro
(74) *Attorney, Agent, or Firm* — Knobbe, Martens, Olson & Bear, LLP

(57) ABSTRACT

Disclosed is a secondary battery, which includes: an electrode assembly; a can receiving the electrode assembly; and an insulation case provided at an upper part of the electrode assembly inside the can, where a stepped part thinner than the can is formed on an inner surface of an upper part of the can. The insulation case can be inserted to the stepped part and the cap plate can be seated on a second stepped part formed at the upper part of the stepped part and can have protrusions that contact the stepped part. The insulation case and cap plate are stably assembled to the can, thereby improving reliability of the process to weld the cap plate to the upper part of the can.

18 Claims, 11 Drawing Sheets

SECONDARY BATTERY HAVING A STEPPED CAN AND AN INSULATION CASE WITH AT LEAST ONE PROJECTION

CLAIM FOR PRIORITY

This application is based on and claims priority to Korean Patent Application No. 10-2008-0055049 filed on Jun. 12, 2008, in the Korean Intellectual Property Office (KIPO), the entire contents of which are hereby incorporated by reference.

BACKGROUND

1. Field of the Invention

The present invention relates to a secondary battery, and more particularly, to a secondary battery that can improve the assembling workability and reliability of the battery.

2. Description of the Prior Art

Generally, secondary batteries have been actively developed along with the rapid development of lightweight and high function portable wireless devices such as video cameras, cellular phones, portable computers and others. The secondary battery includes, for example, a nickel-cadmium battery, a nickel-hydrogen battery, a nickel-zinc battery and a lithium secondary battery, etc. Among these battery chemistries, the lithium secondary battery has been widely used for advanced electronic devices because it can be recharged and is also relatively small so as to provide a high capacity battery with a high operating voltage and high energy density per unit weight.

The lithium secondary battery includes an electrode assembly constituted of cathode and anode plates and a separator in a can with electrolyte. An upper opening of the can is sealed by a cap assembly. A cap plate of the cap assembly is combined to the upper opening of the can by welding, etc.

An insulation case is inserted into the can and is provided at the upper part of the electrode assembly before the cap plate of the cap assembly is coupled to the can. The insulation case interposed between the electrode assembly and cap assembly prevents an electrical short between the electrode assembly and the cap assembly.

However, there has been a problem in the procedure in which the electrode assembly and insulation case are inserted into the can.

Usually, a seating projection is formed at the upper part of the can to seat the cap plate of the cap assembly. Accordingly, after the electrode assembly is inserted into the can past the seating projection, the insulation case is more deeply inserted into the can.

The insulation case is generally easily inserted to the position of the seating projection formed at the upper part of the can. However, when the insulation case is more deeply inserted inside the can, the insulation case typically must be forcibly inserted by a pressing force that is applied downward. Accordingly, when the insulation case is not exactly inserted to an assembling position on the upper part of the electrode assembly, the insulation case may twist or rotate such that a portion of the insulation case may project out of the can. Particularly, when a projection contacted to the inner surface of the can is formed at the side surface of the insulation case, this problem occurs more often and the assembling error rate is increased. That is the reason that contact area between the projection of the insulation case and the inner surface of the can is relatively small and thus if the pressing force is uneven, or if a unit guiding the insulation case is not provided at the inner surface of the can the insulation case may be more often separated from the can.

As described above, when the insulation case is separated from the can, the entire assembling process is delayed.

In addition, a problem may occur even when the insulation case is not separated from the can after the insulation case is forcibly inserted into the can.

In other words, the conventional insulation case is inserted inside the can in a state that the insulation case is usually placed on the electrode assembly. However, the electrode assembly is formed by winding cathode and anode plates and the separator interposed between them together. The separator is formed wider than the cathode and anode plates to insulate the two plates from each other. Accordingly, the separator is projected out of upper and lower parts of the completely assembled electrode assembly by a certain length. Accordingly, when the insulation case is inserted into the can and assembled to press against the upper part of the electrode assembly, the separator projected out of the upper part of the electrode assembly is compressed by the insulation case. Over time, the resiliency of the separator may result in the separator protruding out of the can and urging the insulator case upward.

Usually, after the insulation case is inserted into the can and the cap plate is seated on the seating projection formed at the upper part of the can, a bonding process is performed such as welding, etc. to secure the cap plate to the can. However, the reliability of the welding process is degraded when the insulation case inserted into the can is projected out of the can by the resilience of the separator. The insulation case is easily projected out of the can by resilience of the separator projected out of the upper part of the electrode assembly because the insulation case is often very shallowly inserted into the can.

As described above, the conventional insulation case is forcibly inserted into the can and thus the assembling the insulation case into the can is problematic.

In addition, welding reliability of the cap plate welded to the upper part of the can can be degraded because the insulation case is projected out of the can after the insulation case is assembled in the can by the resiliency of the separator when it is in contact with the separator.

SUMMARY

An object of the present invention is to provide a secondary battery that can improve assembling workability by making it more difficult for an insulation case being inserted into a can to become separated from the can.

Another object of the present invention is to provide a secondary battery that can improve reliability of welding process of a cap plate assembled to an upper part of the can by stably maintaining the insulation case at a first location in the case after it has been inserted into the can.

Additional advantages, objects and features of the invention will be set forth in part in the description which follows and in part will become apparent to those having ordinary skill in the art upon examination of the following or may be learned from practice of the invention.

According to one aspect of the present invention, there is provided a secondary battery, which includes: an electrode assembly; a can receiving the electrode assembly; and an insulation case provided at an upper part of the electrode assembly inside the can, where a stepped part thinner than the can is formed on an inner surface of an upper part of the can.

The insulation case may be seated on a bottom of the stepped part.

The stepped part may be formed at a wide wall of the can. Or, the stepped part may be formed at a narrow wall of the can. Or, the stepped part may be formed at the wide and narrow walls of the can.

A depth of the stepped part may be longer than a height of the insulation case.

The stepped part may be formed in a depth of 2.5 to 8.0 mm downward from an upper opening of the can.

A distance between the bottom of the stepped part and a lower end of the insulation case may be 0 to 1.5 mm.

A width of the stepped part may be less than 70% of a thickness of the can. The thickness of the can may be 0.3 mm and the width of the stepped part may be less than 0.2 mm.

The secondary battery may further include a cap plate combined to the upper part of the can.

A second stepped part thinner than the stepped part may be formed at the upper part of the stepped part and the cap plate may be seated on the second stepped part.

The second stepped part may be formed at the wide wall of the can. Or, the second stepped part may be formed at the narrow wall of the can. Or, the second stepped part may be formed at the wide and narrow walls of the can.

The second stepped part may be formed in a depth of 0.65 to 0.85 mm from the upper opening of the can.

The insulation case may include a flat main body and at least one projection formed around the main body.

The projection may be formed at a long or short edge of the main body.

A sectional surface of the projection may have an arc or rectangular shape.

The present invention may be applied in a rectangular battery having a rectangular can and also in a cylindrical battery having a cylindrical can.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Figure 1:
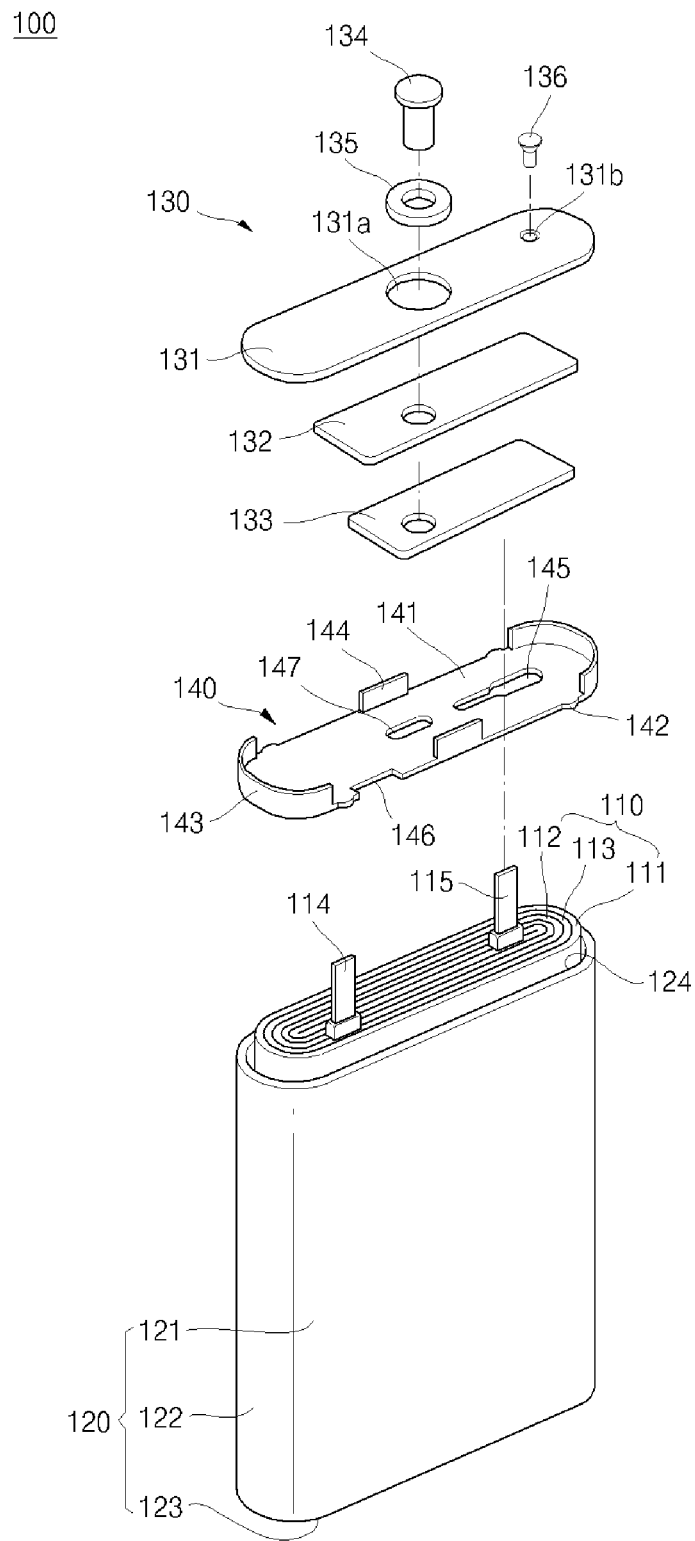
FIG. 1 is an exploded perspective view illustrating a secondary battery according to one exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
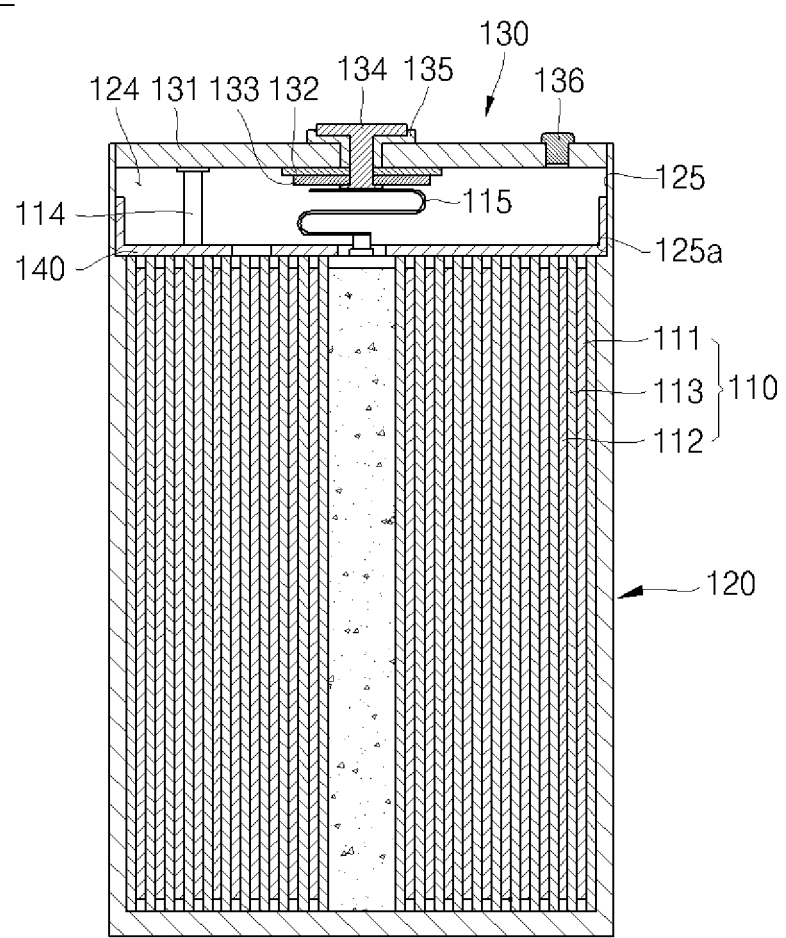
FIG. 2 is a sectional view illustrating a combined state of the secondary battery.
Figure 3:
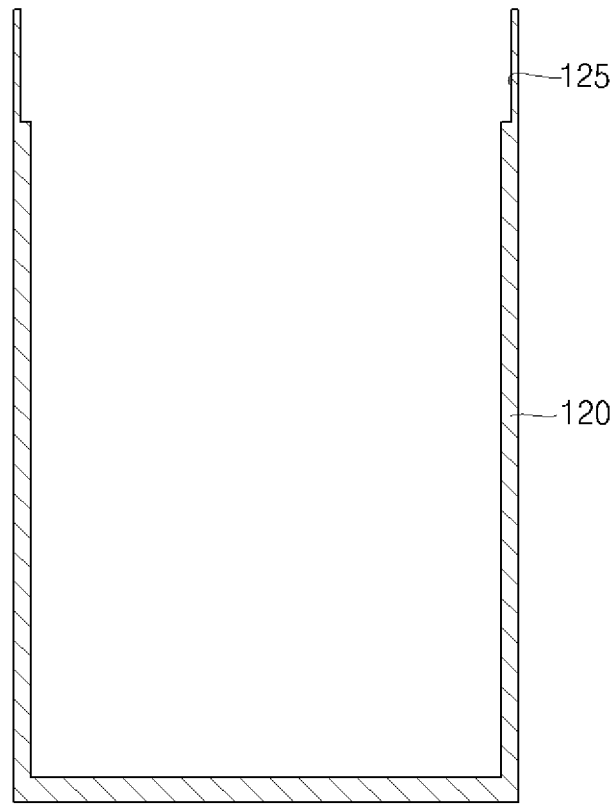
FIG. 3 is a sectional view illustrating a can of the secondary battery.
Figure 4A:
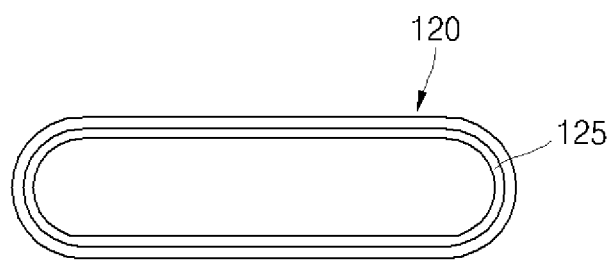
FIG. 4A is a plan view of FIG. 3.
Figure 4B:
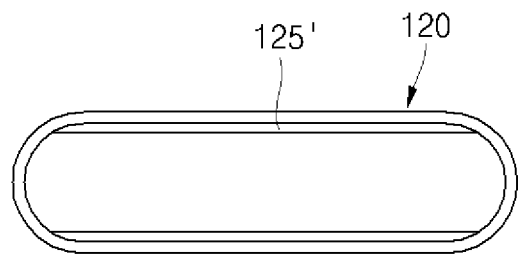
FIGS. 4B and 4C are views illustrating other embodiments of the can of FIG. 4A.
Figure 4C:
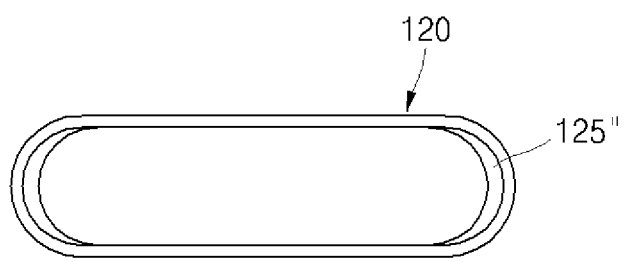
Figure 6:
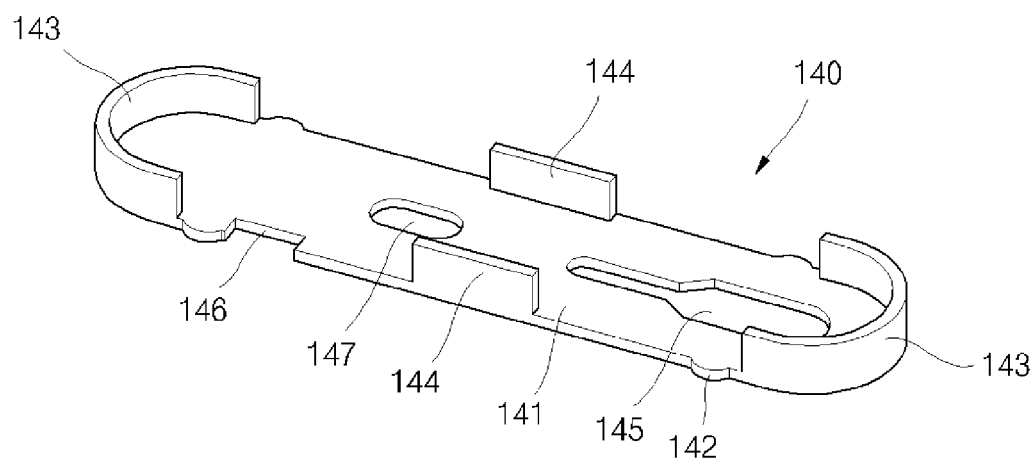
FIG. 6 is a perspective view illustrating an insulation case according to one exemplary embodiment of the present invention.
Figure 7A:
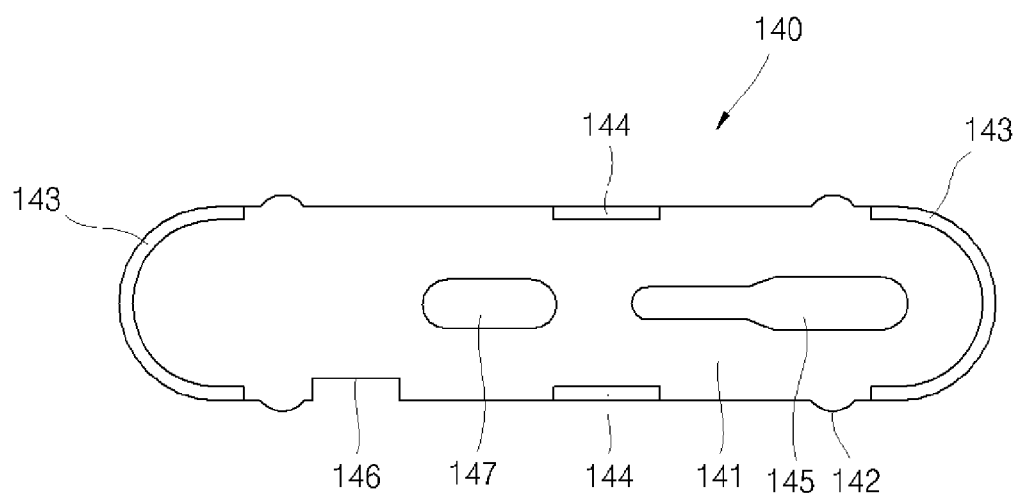
FIG. 7A is a plan view of FIG. 6.
Figure 7B:
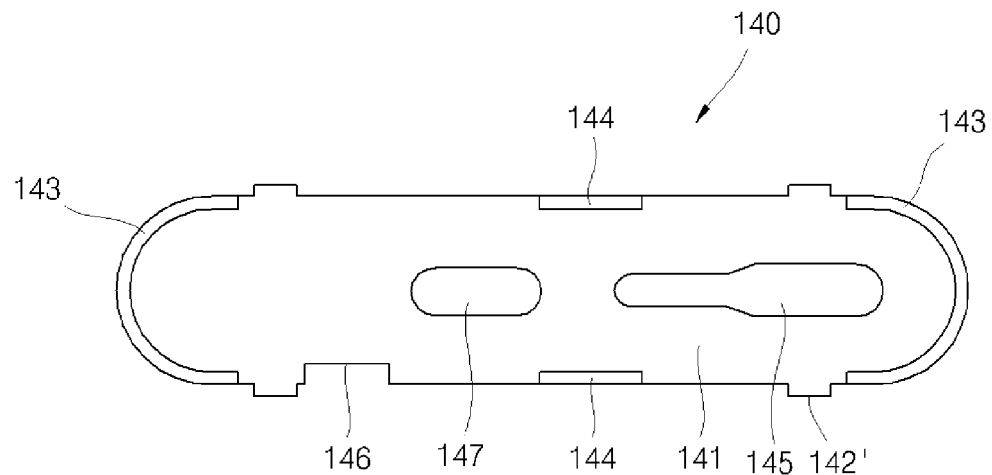
FIGS. 7B and 7C are views illustrating other embodiments of the insulation case of FIG. 7A.
Figure 7C:
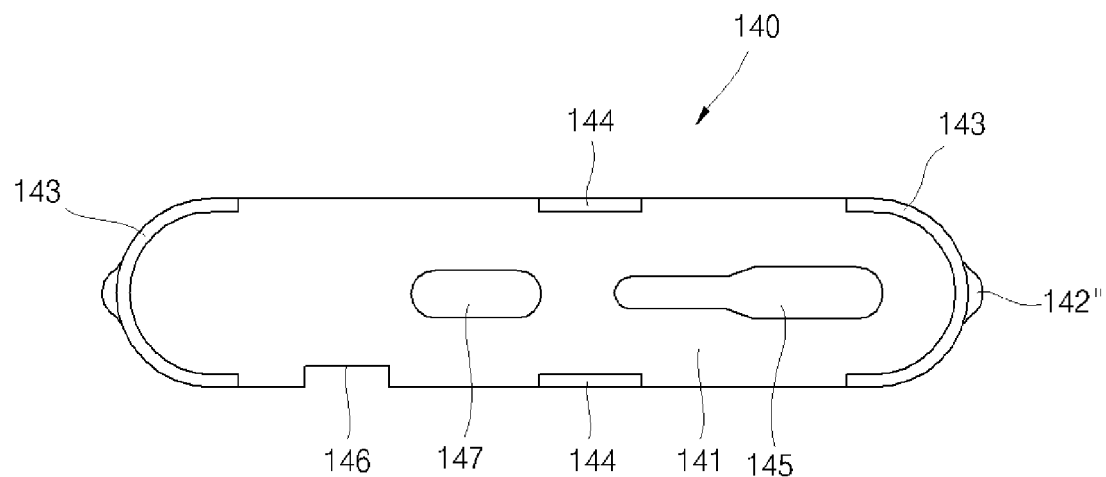

FIG. 1 is an exploded perspective view illustrating a secondary battery according to one exemplary embodiment of the present invention and FIG. 2 is a sectional view illustrating a combined state of the secondary battery and FIG. 3 is a sectional view illustrating a can of the secondary battery and FIG. 4A is a plan view of FIG. 3 and FIGS. 4B and 4C are views illustrating other embodiments of the can of FIG. 4A and FIG. 6 is a perspective view illustrating an insulation case according to one exemplary embodiment of the present invention and FIG. 7A is a plan view of FIG. 6 and FIGS. 7B and 7C are views illustrating other embodiments of the insulation case of FIG. 7A.

Referring to FIGS. 1 to 7, a secondary battery 100 includes an electrode assembly 110, a can 120 and a cap assembly 130. In addition, an insulation case 140 is interposed between the electrode assembly 110 and cap assembly 130.

The electrode assembly 110 is formed by interposing a separator 113 between the cathode and anode plates 111 and 112 and winding them together in a jelly-roll type.

A cathode tab 114 is combined to the cathode plate 111 and projected out of an upper part of the electrode assembly 110. An anode tab 115 is combined to the anode plate 112 and projected out of an upper part of the electrode assembly 110. In the electrode assembly 110, the cathode and anode tabs 114 and 115 are spaced from each other by a predetermined distance and electrically insulated from each other. In addition, the separator 113 interposed between the cathode and anode plates 111 and 112 is formed wider than the cathode and anode plates 111 and 112, thereby improving insulating performance between them. Accordingly, the separator 113 projects by a predetermined length out of the upper and lower parts of the electrode assembly 110 that is wound in the jelly-roll type.

The can 120 is formed in a shape of roughly rectangular box that includes a wide wall 121, a narrow wall 122 formed of a short side wall shorter than the wide wall 121, a lower plate 123 formed integrally with the wide and narrow walls 121 and 122 and an upper opening 124. The can 120 is made of metal. It is desirable that the can is made of light and flexible aluminum or aluminum alloy, but not limited thereto. It is desirable that the can 120 is formed by a deep drawing method. The wide and narrow walls 121 and 122 and lower plate 123 are formed integrally with each other.

A stepped part 125 is formed inside the can 120 and the insulation case 140 can be inserted into the can 120 through the stepped part 125.

The stepped part 125 is formed at a region in the can 120 corresponding to the position where the insulation case 140 is assembled.

The stepped part 125 is formed on inner surfaces of the wide and narrow walls 121 and 122. When the stepped part 125 is formed on inner circumference of the wide and narrow walls 121 and 122, the insulation case 140 is stably assembled by the stepped part 125 formed on the inner surface of the can 120.

Or, a stepped part 125' may be formed only on the inner surfaces of both wide walls 121 in the manner shown in FIG. 4B. Accordingly, the stepped part 125' formed on the wide wall 121 of the can 120 is contacted to a long edge of the insulation case 140 and thus the insulation case 140 can be smoothly inserted into the can 120.

Or, a stepped part 125" may be formed only on the inner surfaces of both narrow walls 122 in the manner shown in FIG. 4C. Accordingly, the stepped part 125" formed on the narrow wall 122 of the can 120 is contacted to a short edge of the insulation case 140 and thus the insulation case 140 can be smoothly inserted into the can 120.

As described above, even if the stepped part 125' or 125" is formed on a portion of the inner surface of the can 120, the insulation case 140 is sized relative to the opening 124 so it can be smoothly inserted into the can 120. In addition, the insulation case 140 is sized to be fixed to the stepped part 125' or 125".

Figure 5:
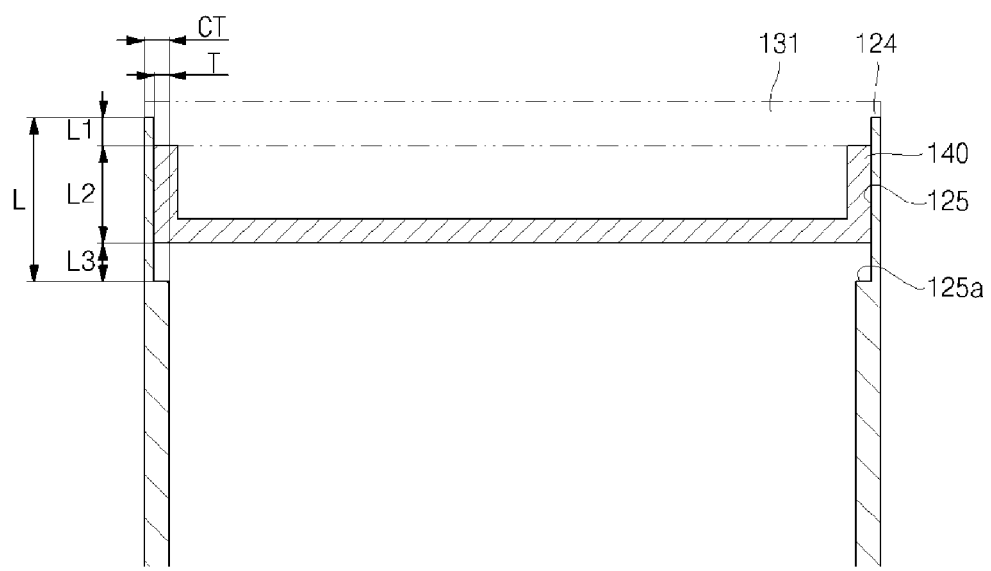
FIG. 5 is a partial section view illustrating a can of the secondary battery.

Referring to FIG. 5, the stepped part 125 is formed in at least a depth (L) so as to allow the insulation case 140 to be completely received in the can 120 and placed on the electrode assembly 110.

The depth (L) of the stepped part 125 is roughly 2.5 to 8 mm from the upper opening 124 of the can 120. In other words, the depth (L) of the stepped part 125 should be more than 2.5 mm to insert the insulation case 140 into the can 120. Here, it is desirable that the depth (L) of the stepped part 125 is at least 2.5 mm because the insertion depth (L1) of the cap plate 131 inserted into the upper part of the can 120 is 0.85 mm at maximum and the depth (L2) of the insulation case 140 is 1.65 mm at maximum.

When the depth (L) of the stepped part 125 is more than 8 mm, the insulation case 140 is located at too low of a position in the can 120 and thereby interferes with the electrode assembly 110.

The insulation case 140 may be inserted into a bottom 125a of the stepped part 125. Accordingly, the insulation case 140 is stably supported on the bottom 125a of the stepped part 125.

Or, even if the insulation case 140 is not inserted to the bottom 125a of the stepped part 125, the lower end of the insulation case 140 is spaced from the bottom 125a of the stepped part 125 by a distance less than 1.5 mm. In other words, it is desirable that a distance (L3) between the lower end of the insulation case 140 provided at the stepped part 125 and the bottom 125a of the stepped part 125 is 0 to 1.5 mm. In other words, when the lower end of the insulation case 140 is spaced from the bottom 125a of the stepped part 125 by a distance more than 1.5 mm, the insulation case 140 is not stably positioned on the inner surface of the can 120. In addition, when the distance between the insulation case 140 and the upper part of the electrode assembly 110 is increased, space utilization of the can 120 may be reduced.

It is desirable that a width (T) of the stepped part 125 is less than 70% of a total thickness (CT) of the can. The thickness of the can is usually 0.3 mm. Accordingly, the can becomes too thin when the width (T) of the stepped part 125 is more than 70% of the thickness (CT) of the can. It is desirable that the width (T) of the stepped part 125 is less than 0.2 mm when the thickness (CT) of the can is 0.3 mm.

The cap assembly 130 includes the cap plate 131, an insulation plate 132, a terminal plate 133 and an electrode terminal 134.

The cap plate 131 is made of metal plate having size and shape that correspond to the upper opening 124 of the can 120. A predetermined size of terminal hole 131a is formed at the middle of the cap plate 131 and an electrolyte injection hole 131b is formed at one side of the cap plate 131. Electrolyte is injected through the electrolyte injection hole 131b and then the electrolyte injection hole 131b is sealed by a stopper 136.

The electrode terminal 134 is inserted into the terminal hole 131a and a tubular gasket 135 is provided at an outer surface of the electrode terminal 134 for insulation from the cap plate 131. The insulation plate 132 is provided under the cap plate 131 and the terminal plate 133 is provided under the insulation plate 132. A bottom part of the electrode terminal 134 is electrically coupled to the terminal plate 133 with the insulation plate 132 interposed between them.

The cathode tab 114 is welded to the lower surface of the cap plate 131 and the anode tab 115 is welded to the terminal plate 133. The cathode and anode tabs 114 and 115 are made of nickel.

The insulation case 140 is provided over the electrode assembly 110. The insulation case 140 electrically insulates the electrode assembly 110 from the cap assembly 130 and fixes positions of the electrode assembly 110 and cathode and anode tabs 114 and 115.

Referring to FIG. 6, the insulation case 140 includes a body 141, a projection 142 formed at periphery of the body 141, a short edge supporter 143 and a long edge supporter 144. The insulation case 140 includes an electrode tab withdrawing hole 145, an electrode tab withdrawing groove 146 and an electrolyte hole 147, where the anode tab 115 is withdrawn through the electrode tab withdrawing hole 145 and the cathode tab 114 withdrawn through the electrode tab withdrawing groove 146 and the electrolyte is injected into the electrode assembly 110 through the electrolyte hole 147.

At least one projection 142 is formed at the periphery of the body 141.

The projection 142 is projected toward the stepped part 125 formed on the inner surface of the can 120. When the insulation case 140 is positioned in the can 120, the projection 142 is forcibly inserted to the stepped part 125 formed on the inner surface of the can 120. Accordingly, when the insulation case 140 is inserted and fixed to the stepped part 125, movement of the electrode assembly 110 is prevented by the insulation case 140. Thus, movement of the cathode and anode tabs 114 and 115 is reduced to prevent a short between electrodes.

In the embodiment, two projections 142 are respectively formed at both long edges of the body 141 of the insulation case 140. The projection 142 has a circular sectional surface and thus the projection 142 is forcibly inserted into the can 120 through point-contact with the stepped part 125. Since the contact area between the projection 142 and the stepped part 125 is reduced thus the projection 142 is smoothly inserted and the insulation case 140 can more easily be positioned in the can 120.

A projection 142' (FIG. 7B) of the insulation case 140 may have a rectangular sectional surface. Thus contact area between the projection 142' and the stepped part 125 becomes wider. Thus the contact area after insertion is increased.

In addition, the projection 142" (FIG. 7C) may be formed only both short edges of the body 141. The projection 142" is contacted to the stepped part 125 formed at the narrow wall 122 on the inner surface of the can 120 and forcibly inserted.

The method by which the insulation case of the secondary battery is positioned in the can will be explained below.

Firstly, the electrode assembly 110 formed by winding the cathode plate 111, separator 113 and anode plate 112 together is positioned in the can 120.

Then, the insulation case 140 is inserted through the upper opening 124 of the can 120. In this time, the projections 142 formed at the long and short edges of the insulation case 140 are guided and inserted to the stepped part 125 formed in a predetermined length at the wide and narrow walls 121 and 122 on the inner surface of the can 120. The projections 142 thus contact the inner walls of the stepped part 125. Accordingly, after the insulation case 140 passes the upper opening 124 of the can 120 and is inserted toward the lower part of the stepped part 125, the insulation case 140 is continuously inserted while being in contact with the can 120.

When the insulation case 140 is seated on the bottom 125*a* of the stepped part 125, the insulation case 140 is no longer inserted downward and the insertion is completed such that the electrode assembly 110 is not pressed by the insulation case 140. At this time, the insulation case 140 located on the bottom 125*a* of the stepped part 125 may contact the separator 113 projected out of the upper part of the electrode assembly 110 by a depth of about 0.3 mm.

On the other hand, the insulation case 140 may not be inserted to the bottom 125*a* of the stepped part 125. The assembling process can be also completed before the insulation case 140 is positioned to the bottom 125*a* of the stepped part 125 because the insulation case 140 is frictionally engaged with the can 120 by the projection 142 formed on the side surface thereof. Thus, the insulation case 140 is supported in the can 120 by the projections 142 and thus the insulation case 140 is less likely to be urged out of the can 120 and remains in contact with the can 120.

It is desirable that the distance (L3) between the bottom 125*a* of the stepped part and the lower end of the insulation case 140 be less than 1.5 mm when the insulation case 140 is assembled. As the space utilization is reduced when the insulation case 140 is not seated on the bottom 125*a* of the stepped part 125, or when the distance between the insulation case 140 and electrode assembly 110 is increased.

After the insulation case 140 is inserted, the cap plate 131 is assembled to the upper opening 124 of the can 120 by welding, etc. The insulation case 140 preferably does not excessively exert force against the electrode assembly 110 in the can 120, and the insulation case 140 is in a proper position with respect to the electrode assembly 110. Accordingly, the cap plate 131 can be stably welded to the upper opening 124 of the can 120 which is not interfered with by the insulation case 140 projected out of the can 120 as a result of contact with the electrode assembly, thereby improving reliability of the welding process.

After the cap plate 131 is assembled to the upper opening of the can 120, the electrolyte is injected into the can 120 through the electrolyte injection hole 131*b* of the cap plate 131 and the electrolyte injection hole 131*b* is sealed the stopper 136.

A secondary battery according to another embodiment of the present invention will be explained below.

Figure 8:
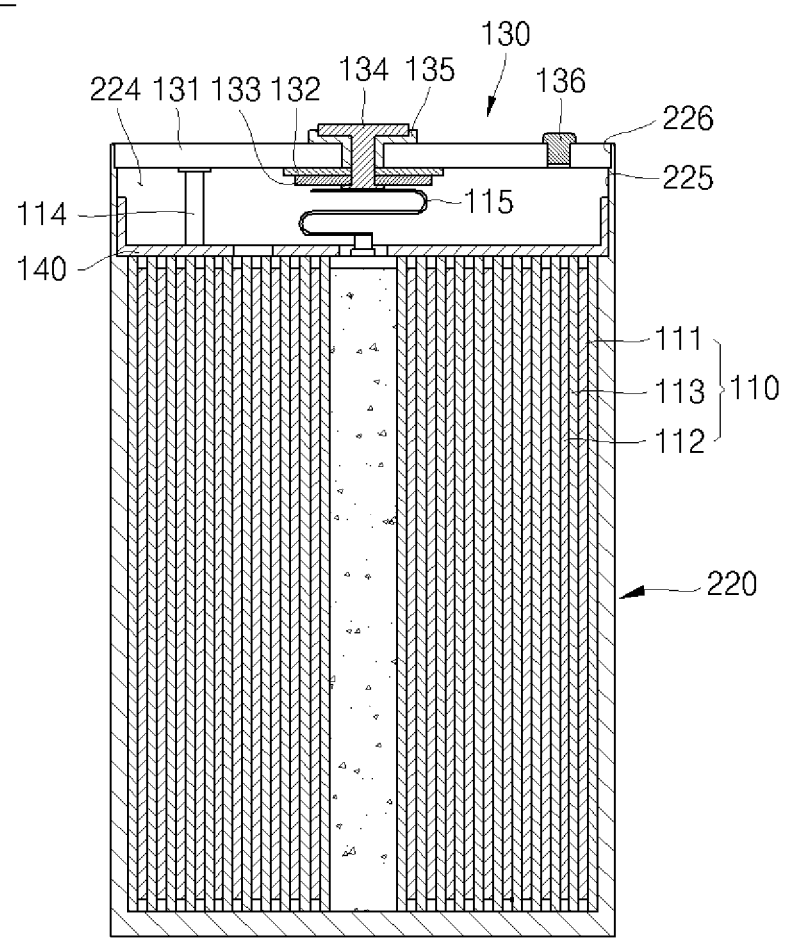
FIG. 8 is a sectional view illustrating a combined state of a secondary battery according to another exemplary embodiment of the present invention.
Figure 9:
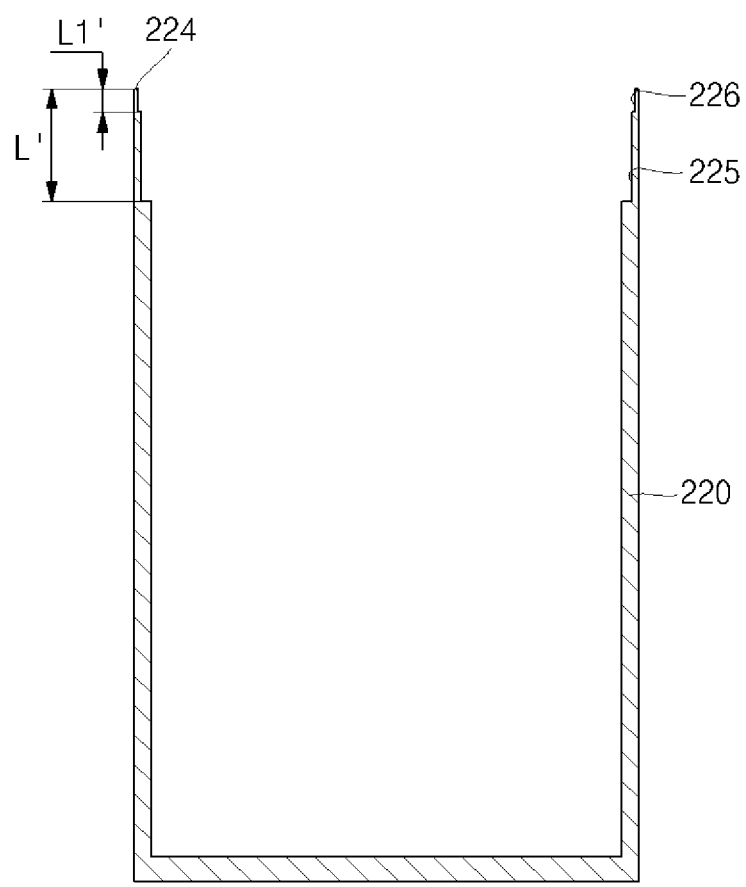
FIG. 9 is a sectional view illustrating a can of the secondary battery.
Figure 10A:
FIG. 10A is a plan view of FIG. 9.
Figure 10B:
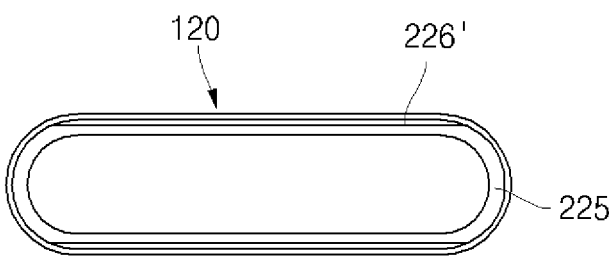
FIGS. 10B and 10C are views illustrating other embodiments of the can of FIG. 10A.
Figure 10C:

FIG. 8 is a sectional view illustrating a combined state of a secondary battery according to another exemplary embodiment of the present invention and FIG. 9 is a sectional view illustrating a can of the secondary battery and FIG. 10A is a plan view of FIG. 9 and FIGS. 10B and 10C are views illustrating other embodiments of the can of FIG. 10A.

Referring to FIGS. 8 to 10, a secondary battery 200 includes an electrode assembly 110, a can 220 and a cap assembly 130. In addition, an insulation case 140 is interposed between the electrode assembly 110 and cap assembly 130.

Constructions of the electrode assembly 110, can 220, cap assembly 130 and insulation case 140 of the secondary battery 200 are the same as the elements of the above embodiment and the same drawing reference numerals are used for the same elements. Accordingly, detailed explanation will be omitted.

In the secondary battery 200, a first stepped part 225 thinner than the can 220 is formed on an inner surface of the can 220 so as to allow the insulation case 140 to be inserted into the can 120 and a second stepped part 226 thinner than the first stepped part 225 is formed at an upper part of the first stepped part 225.

The insulation case 140 is inserted to the first stepped part 225 and the cap plate 131 of the cap assembly 130 is seated on the second stepped part 226.

As described above, the second stepped part 226 is formed at the upper part of the can 220 and the cap plate 131 is seated on the second stepped part 226. It is desirable that the second stepped part 226 is formed on both wide and narrow walls of the can 220.

When the second stepped part 226 is formed on inner circumferences of the wide and narrow walls of the can 220, the cap plate 131 can be stably provided to the upper part of the can 220.

Or, a second stepped part 226' may be formed only on the inner surfaces of both wide walls of the can 220. Accordingly, the cap plate 131 can be stably supported and welded to the upper part of the can 220 by the second stepped part 226' formed at the wide walls of the can 220.

Or, a second stepped part 226" may be formed only on the inner surfaces of both narrow walls of the can 220. Accordingly, the cap plate 131 can be stably supported and easily welded to the upper part of the can 220 by the second stepped part 226" formed at the wide walls of the can 220.

Referring to FIG. 9, the depth (L') of the stepped part 225 may be roughly 2.5 to 8 mm from an upper opening 224 of the can 220. In addition, the depth (L1') of the second stepped part 226 may be 0.65 to 0.85 mm from the upper opening 224 of the can 220. The depth (L1') of the second stepped part 226 may be changed according to the thickness of the cap plate 131 seated on the second stepped part 226, which will be obvious to those of ordinary skill in the art.

In assembling the secondary battery 200, firstly the electrode assembly 110 is positioned in the can 220. Then, the insulation case 140 is forcibly inserted through the first stepped part 225 formed on the inner surface of the can 220 and assembled to a proper position at the upper part of the electrode assembly 110.

Next, the cap assembly 130 is combined to the upper part of the can 220. At this time, the cap plate 131 of the cap assembly 130 is seated so that lower and side surfaces of the periphery of the cap plate 131 contact the second stepped part 226 formed at the upper part of the can 220. Then, the upper part of the side surface of the periphery of the cap plate 131 is welded to the upper part of the can 220, thereby completing assembly of the cap plate 131.

After the cap plate 131 is assembled, the electrolyte is injected through the electrolyte injection hole 131*b* and the electrolyte injection hole 131*b* is sealed by the stopper 136.

In the above embodiments, the secondary battery using the rectangular type can 120 or 220 has been mainly explained. However, the present invention can be applied in a cylindrical battery 300 having a cylindrical can 320.

Figure 11:
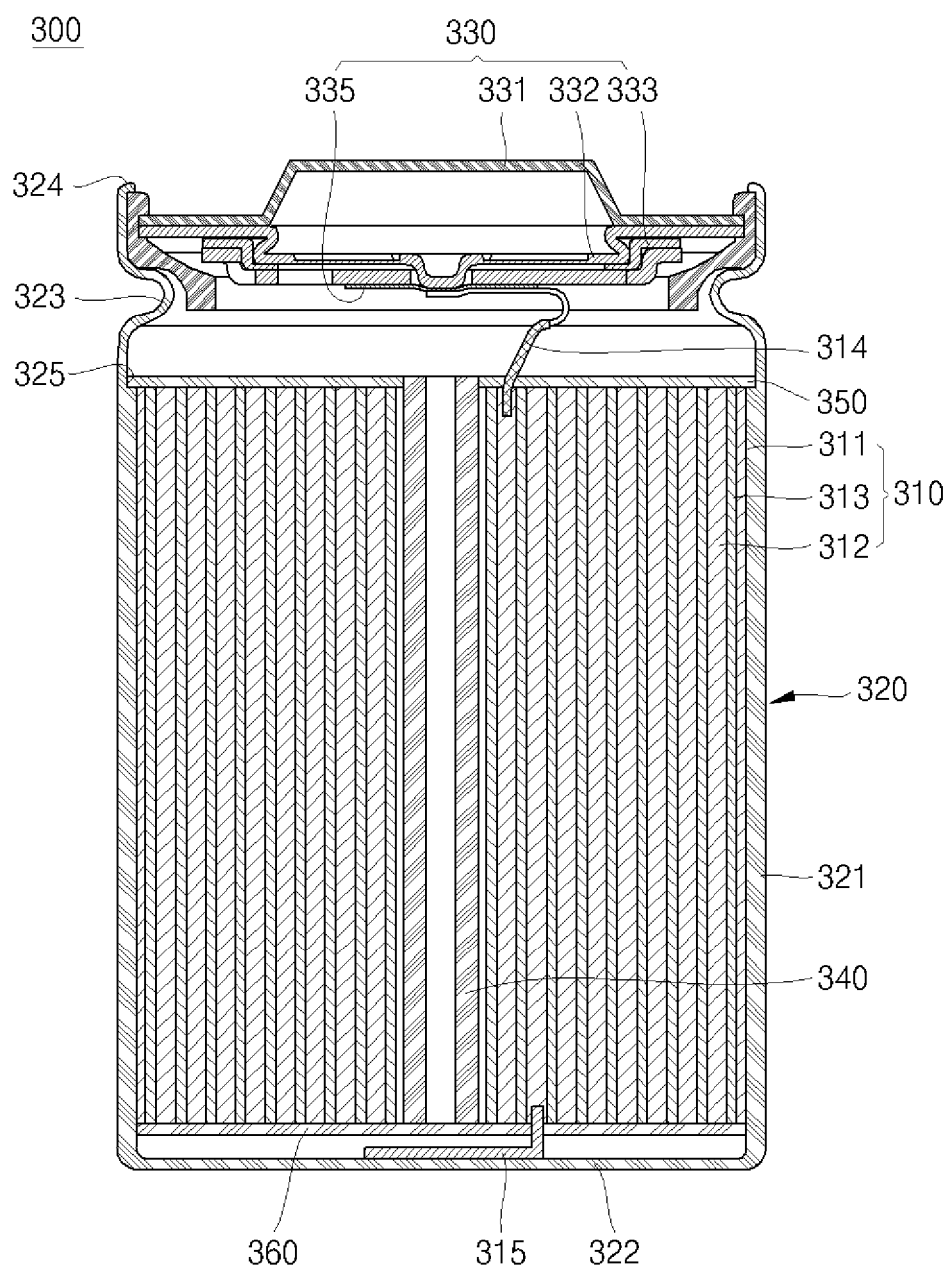
FIG. 11 is a sectional view illustrating a cylindrical battery according to the present invention.

FIG. 11 is a sectional view illustrating a cylindrical battery according to the present invention.

Referring to FIG. 11, the cylindrical battery 300 includes an electrode assembly 310 that is formed by interposing a separator 313 between cathode and anode plates 311 and 312 and winding them together, a cylindrical can 320 having an upper opening to receive the electrode assembly 310 and electrolyte, a cap assembly 330 provided at the upper opening to seal the cylindrical can 320, a center pin 340 inserted into a core of the electrode assembly 310, and upper and lower insulation plates 350 and 360 provided at upper and lower parts of the electrode assembly 310.

The cylindrical can 320 includes a side plate 321, that is, a cylinder having a predetermined diameter and a lower plate 322 sealing a lower part of the side plate 321, thereby forming space to receive the electrode assembly 310. The upper opening of the cylindrical can 320 is sealed after the electrode assembly 310 is inserted through the opening. In addition, a beading part 323 is formed at the upper part of the cylindrical can 320 to prevent movement of the electrode assembly 310. A crimping part 324 is formed at the uppermost of the cylindrical can 320 to fix the cap assembly 330.

A stepped part 325 is provided on the inner surface of the upper part of the cylindrical can 320.

The depth of the stepped part 325 is formed to a position below the beading part 323. The upper insulation plate 350 is seated on the electrode assembly 310 and thus the stepped part 325 is formed to the position where the upper insulation plate 350 is seated.

In the cylindrical battery 300 having the above construction, firstly the electrode assembly 310 is inserted into the cylindrical can 320 and the upper insulation plate 350 is inserted.

When the upper insulation plate 350 is inserted, the side surface of periphery of the upper insulation plate 350 is contacted to the stepped part 325 and guided by the stepped part 325. Thus, the upper insulation plate 350 is not separated from the cylindrical can 320. In addition, the upper insulation plate 350 is seated on the bottom of the stepped part 325 and thus exactly located on the upper part of the electrode assembly 310.

Then, the cap assembly 330 is combined to the upper part of the cylindrical can 320, thereby completing assemblage of the cylindrical battery 300.

As described above, the secondary battery according to the present invention produces the following effects.

The insulation case is guided to be assembled in the can, thereby improving assembling workability of the battery.

The cap plate can be stably seated at the upper part of the can by guiding assembly of the insulation case in the can, thereby improving assembling workability of the battery.

The insulation case and cap plate are exactly assembled to the inside and upper part of the can, thereby improving reliability of the process to weld the cap plate to the upper part of the can.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
   an electrode assembly;
   a can receiving the electrode assembly wherein the can includes a wall of a first thickness; and
   an insulation case having a body that defines a periphery provided at an upper part of the electrode assembly inside the can wherein the insulation case includes at least one projection that extends outward from the periphery of the body towards the wall of the can,
   wherein a first stepped part is formed on an inner surface of an upper part of the can that has a thickness less than the first thickness wherein the insulation case is positioned in the first stepped part so that the at least one projection engages with the first stepped part; further comprising a cap plate combined to the upper part of the can, where a second stepped part thinner than the first stepped part is formed at an upper part of the stepped part and the cap plate is seated on the second stepped part, and wherein the insulation case comprises a flat main body and at least one projection formed around the main body.

2. The secondary battery of claim 1, wherein the insulation case is seated on a bottom of the first stepped part.

3. The secondary battery of claim 1, wherein the first stepped part is formed at a wide wall of the can.

4. The secondary battery of claim 1, wherein the first stepped part is formed at a narrow wall of the can.

5. The secondary battery of claim 1, wherein the first stepped part is formed at wide and narrow walls of the can.

6. The secondary battery of claim 1, wherein a depth of the first stepped part is longer than a height of the insulation case.

7. The secondary battery of claim 6, wherein the first stepped part is formed in a depth of 2.5 to 8.0 mm downward from an upper opening of the can.

8. The secondary battery of claim 1, wherein a distance between the bottom of the stepped part and a lower end of the insulation case is 0 to 1.5 mm.

9. The secondary battery of claim 1, wherein a width of the first stepped part is less than 70% of a thickness of the can.

10. The secondary battery of claim 9, wherein the thickness of the can is 0.3 mm and the width of the first stepped part is less than 0.2 mm.

11. The secondary battery of claim 1, wherein the second stepped part is formed at the wide wall of the can.

12. The secondary battery of claim 1, wherein the second stepped part is formed at the narrow wall of the can.

13. The secondary battery of claim 1, wherein the second stepped part is formed at the wide and narrow walls of the can.

14. The secondary battery of claim 1, wherein the second stepped part is formed in a depth of 0.65 to 0.85 mm from the upper opening of the can.

15. The secondary battery of claim 1, wherein the projection is formed at a long edge of the main body.

16. The secondary battery of claim 1, wherein the projection is formed at a short edge of the main body.

17. The secondary battery of claim 1, wherein a sectional surface of the projection has an arc or rectangular shape.

18. The secondary battery of claim 1, wherein the can is a cylindrical can.

* * * * *